(12) United States Patent
Paul et al.

(10) Patent No.: US 8,440,304 B2
(45) Date of Patent: May 14, 2013

(54) ACRYLIC PRESSURE SENSITIVE ADHESIVE FORMULATION AND ARTICLES COMPRISING SAME

(75) Inventors: Charles W. Paul, Madison, NJ (US); Wu Suen, Flemington, NJ (US)

(73) Assignee: Henkel Corporation, Rocky Hill, CT (US)

( * ) Notice: Subject to any disclaimer, the term of this patent is extended or adjusted under 35 U.S.C. 154(b) by 651 days.

(21) Appl. No.: 12/211,481

(22) Filed: Sep. 16, 2008

(65) Prior Publication Data
US 2010/0068515 A1    Mar. 18, 2010

(51) Int. Cl.
B32B 9/04       (2006.01)
C08F 220/10    (2006.01)

(52) U.S. Cl.
USPC ........... 428/411.1; 428/426; 428/355 AC; 526/78; 526/328.5

(58) Field of Classification Search ........... 428/355 AC, 428/522, 442, 413, 426; 526/78, 328.5
See application file for complete search history.

(56) References Cited

U.S. PATENT DOCUMENTS

| | | | |
|---|---|---|---|
| RE27,145 E | | 6/1971 | Jones |
| 4,150,170 A | * | 4/1979 | Lazear et al. ............ 427/516 |
| 4,593,068 A | | 6/1986 | Hirose et al. |
| 4,722,976 A | * | 2/1988 | Ceska ............ 525/301 |
| 4,783,504 A | | 11/1988 | St. Clair et al. |
| 4,871,590 A | | 10/1989 | Merz et al. |
| 4,970,254 A | | 11/1990 | Willis et al. |
| 5,006,582 A | | 4/1991 | Mancinelli |
| 5,097,053 A | | 3/1992 | Baghdachi et al. |
| 5,116,910 A | | 5/1992 | Tone et al. |
| 5,210,150 A | | 5/1993 | Prejean |
| 5,331,049 A | | 7/1994 | Audett et al. |
| 5,502,108 A | | 3/1996 | Silver et al. |
| 5,625,005 A | | 4/1997 | Mallya et al. |
| 5,669,940 A | | 9/1997 | Stubbs |
| 6,121,354 A | | 9/2000 | Chronister |
| 6,239,228 B1 | | 5/2001 | Zajaczkowski et al. |
| 6,350,345 B1 | | 2/2002 | Kotani et al. |
| 6,433,055 B1 | | 8/2002 | Kleyer et al. |
| 6,437,071 B1 | | 8/2002 | Odaka et al. |
| 6,437,072 B1 | | 8/2002 | Jyono et al. |
| 6,444,775 B1 | | 9/2002 | Jyono et al. |
| 6,613,816 B2 | | 9/2003 | Mahdi et al. |
| 6,642,298 B2 | | 11/2003 | Foreman et al. |
| 6,642,309 B2 | | 11/2003 | Komitsu et al. |
| 6,649,016 B2 | | 11/2003 | Wu et al. |
| 6,664,323 B2 | | 12/2003 | Lucas |
| 6,670,417 B2 | | 12/2003 | Foreman et al. |
| 6,723,786 B2 | * | 4/2004 | Husemann et al. ............ 524/560 |
| 6,737,159 B2 | * | 5/2004 | Garrett et al. ............ 428/332 |
| 6,749,943 B1 | | 6/2004 | Tangen et al. |
| 6,777,485 B1 | | 8/2004 | Ito et al. |
| 6,803,412 B2 | | 10/2004 | Nguyen-Misra et al. |
| 6,828,403 B2 | | 12/2004 | Mahdi et al. |
| 6,967,226 B2 | | 11/2005 | Shah |
| 7,056,413 B2 | * | 6/2006 | Caspari et al. ............ 156/307.3 |
| 7,067,563 B2 | | 6/2006 | Klein et al. |
| 7,087,127 B2 | | 8/2006 | Mahdi et al. |
| 7,091,298 B2 | | 8/2006 | Schindler et al. |
| 7,153,911 B2 | | 12/2006 | Yano et al. |
| 2005/0043455 A1 | | 2/2005 | Hohner |
| 2005/0142357 A1 | | 6/2005 | Zajaczkowski et al. |
| 2006/0142532 A1 | | 6/2006 | Wintermantel et al. |
| 2008/0125539 A1 | | 5/2008 | Mack |
| 2008/0241407 A1 | | 10/2008 | Chu et al. |

FOREIGN PATENT DOCUMENTS

| | | |
|---|---|---|
| GB | 2197326 A | 5/1988 |
| GB | 2292154 A | 2/1996 |
| JP | 60235747 A | 11/1985 |
| JP | 01163281 A | 6/1989 |
| JP | 01301740 A | 12/1989 |
| JP | 02150488 A | 6/1990 |
| JP | 10251357 A | 9/1998 |
| JP | 2000169544 A | 6/2000 |
| JP | 2003193019 A | 7/2003 |
| JP | 2004176028 A | 6/2004 |
| WO | 8911506 A1 | 11/1989 |
| WO | 8911514 A1 | 11/1989 |
| WO | 9106580 A1 | 5/1991 |
| WO | 9108240 A1 | 6/1991 |
| WO | 0127162 A2 | 4/2001 |

OTHER PUBLICATIONS

A paper "Advanced Polymer Materials Polymers" [online] [retrieved Sep. 7, 2012]. Retrieved from the Internet: < URL: http://www.apmpolymers.com/whatsnew1.htm >, 3 pages.*

* cited by examiner

*Primary Examiner* — Hai Vo
(74) *Attorney, Agent, or Firm* — Sun Hee Lehmann

(57) ABSTRACT

Pressure sensitive adhesive formulations of an acrylic polymer grafted with a macromer are particularly well suited for use in the manufacture of impact resistant articles such as impact resistant glass laminates and products comprising such laminates.

18 Claims, No Drawings

ACRYLIC PRESSURE SENSITIVE ADHESIVE FORMULATION AND ARTICLES COMPRISING SAME

FIELD OF THE INVENTION

The present invention relates to pressure sensitive adhesive formulations. In a particular embodiment, the invention relates to pressure sensitive adhesive formulations comprising an acrylic polymer grafted with rubber macromer and/or a poly(alkylene oxide) macromer. The adhesives are particularly useful in the manufacture of impact resistant articles.

BACKGROUND OF THE INVENTION

Typical acrylic pressure sensitive adhesive formulations are copolymers of alkyl ester monomers, a functional monomer such as acrylic acid, and may be crosslinked using, for example, aluminum or titanium chelates. These adhesives may be further tackified to improve adhesion on different types of substrates, although usually with limitations in resistance to degradation and aging for most graphics and industrial tape applications in which acrylic solutions are conventionally used.

U.S. Pat. Appl. No. 2005/0142357 discloses a high strength pressure sensitive adhesive comprising a blend of a crosslinked liquid polymer, at least one tackifying resin which is compatible with the liquid polymer, and at least one resin which is incompatible or at least partially incompatible with the liquid polymer. Although the formulated products described in this disclosure provide very high performance at ambient temperature, their high temperature performance will be limited by the Tg of the incompatible phase.

U.S. Pat. No. 5,625,005, No. 6,642,298 and No. 6,670,417 disclose hybrid rubber-acrylic pressure sensitive adhesives described as having good UV resistance and aging characteristics along with high adhesion to non-polar surfaces.

Despite these advancements in the art, there continues to be a need for high performance pressure sensitive adhesives having high adhesion and heat resistance properties that are able to meet higher requirements in applications such as industrial tapes and transfer films. There is also a need for a pressure sensitive product with extremely good performances in other areas, such as impact resistance.

Pressure sensitive adhesives that will pass the UL-972 Testing for Burglary Resistant Glazing Materials standard would provide for the manufacture of glass/plastic laminates exhibiting a minimum amount of delamination of a glass substrate from a polyester facestock following impact. This requirement translates into a strong bonding of the pressure sensitive adhesive under a very high speed delamination process, i.e., about 10000× fold higher than regular peeling test speed of 12"/min. Current pressure sensitive adhesive products used for this application do not give satisfactory results when tested by the UL-972 standard.

There is thus a need in the art for pressure sensitive adhesives that will pass the UL-972 standard when used to bond glass to plastic. The present invention addresses this need.

SUMMARY OF THE INVENTION

The invention provides the art with high impact resistance articles manufactured using a pressure sensitive adhesive comprising a polymer having an acrylic backbone and side chains of macromer.

In one aspect of this embodiment the high impact resistant article is prepared using a pressure-sensitive adhesive comprising an acrylic polymer backbone grafted with rubber macromers including, but not limited to, ethylene-butylene macromers, ethylene-propylene macromers and ethylene-butylene-propylene macromers.

In another aspect of this embodiment the high impact resistant article is prepared using a pressure-sensitive adhesive comprising an acrylic polymer backbone grafted with macromers having a polyether backbone. Nonlimiting examples include poly(ethylene glycol) macromers (PEG), poly(propylene glycol) macromers (PPG) and poly(tetramethylene gylcol) macromers (PTMG).

Monomers used to prepare the acrylic polymers used in the practice of the invention will generally comprise at least one low glass transition temperature (Tg) alkyl acrylate monomer (i.e., monomers, homopolymers of which have a Tg less than 0° C.) and may also comprise at least one monomer having a high glass transition temperature (i.e., monomers, homopolymers of which have a Tg greater than 0° C.). Monomers used to prepare the acrylic polymer may also desirably include acid containing monomers and/or hydroxy containing monomers. Preferably, a crosslinking agent such as an aluminum or a titanium crosslinking agent, is used.

Useful acrylic polymers include, for example, acrylic polymers prepared from 2-ethyl hexyl acrylate monomers, acrylic acid monomers, and vinyl acetate or methyl acrylate monomers. In one preferred embodiment, the acrylic polymer comprises 2-ethyl hexyl acrylate, methyl acrylate and acrylic acid. The adhesives may also comprise a tackifier.

In one aspect of this embodiment, the article comprises a glass substrate bonded to a plastic film. In one preferred aspect, the plastic film is a plastic laminate. The impact resistant glass laminates are used in windows, doors, partitions, picture glass, show case panels and storefronts and such articles are encompassed by the invention.

Another embodiment of the invention is directed to methods of preparing glass laminates having high impact resistance and to high impact resistant articles or products prepared using the high impact resistant glass laminates. The method comprising applying a pressure sensitive adhesive to at least a first substrate, the pressure sensitive adhesive comprising the reaction product of an acrylic polymer and a macromer, and bringing at least a second substrate in contact with the adhesive applied to the first substrate. The substrates may be the same or different. In one embodiment, both the first and the second substrates are transparent and clear.

High impact resistant articles/products include impact resistant laminates, in particular laminates made by bonding a brittle or breakable surface to a flexible facestock. Nonlimiting examples of high impact resistant articles prepared using the method of the invention include windows for homes, storefronts such as convenience stores, automobiles, and sliding glass doors, LCD displays, display cabinets, and the like.

Preparation of high impact resistant products prepared using the method of the invention provides the art with a method of preparing burglary resistant products, such as high impact resistant windows, doors and show cases, that will pass the UL-972 testing standard. High impact products comprise a glass substrate bonded to a plastic substrate such as a polyester film. The plastic films used may desirably be plastic film laminates bonded together, preferably, with the adhesive of the invention. In one embodiment the laminate comprises two glass substrates and one or more interlays of a plastic film. Such may be used in the manufacture of windows, doors, partitions, show case panels, storefronts and the like.

Yet another embodiment of the invention is directed toward pressure sensitive adhesives comprising an acrylic polymer backbone grafted with poly(alkylene glycol) macromers and to pressure sensitive adhesive articles comprising such an adhesive. Non-limiting examples of adhesive articles include industrial tapes, transfer films, and the like.

DETAILED DESCRIPTION OF THE INVENTION

As used herein, the term "pressure-sensitive adhesive" refers to a viscoelastic material which adheres instantaneously to most substrates with the application of slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, plasticizers or other additives.

The invention provides the art with impact resistance articles manufactured using an adhesive comprising polymers having an acrylic backbone and side chains of macromer In one embodiment, impact resistant articles may be prepared by using a pressures sensitive adhesive comprising an acrylic polymer backbone grafted with rubber macromers. Rubber macromers include, but are not limited to, ethylene-butylene macromers, ethylene-propylene macromers and ethylene-butylene-propylene macromers.

In another embodiment, impact resistant articles may be prepared using a pressure-sensitive adhesive comprising an acrylic polymer backbone grafted with macromers having a polyether backbone, which may alternatively be referred to herein as an acrylic polymer backbone grafted with polyether macromers. Nonlimiting examples include poly(ethylene glycol) macromers (PEG), poly(propylene glycol) macromers (PPG) and poly(tetramethylene gylcol) macromers (PTMG).

Polymers having an acrylic backbone and side chains of macromer, whether rubber macromers or polyether macromers will generically and interchangeably be referred to herein as grafted polymers or as hybrid polymers.

The acrylic polymer backbone contemplated for use in the practice of the invention is formed of acrylate monomers of one or more low Tg alkyl acrylates. Low transition temperature monomers are those having a Tg of less than about 0° C. Preferred alkyl acrylates which may be used to practice the invention have up to about 18 carbon atoms in the alkyl group, preferably from about 4 to about 10 carbon atoms in the alkyl group. Alkyl acrylates for use in the invention include butyl acrylate, amyl acrylate, hexyl acrylate, 2-ethylhexyl acrylate, isooctyl acrylate, decyl acrylate, dodecyl acrylates, isomers thereof, and combinations thereof. One preferred alkyl acrylate for use in the practice of the invention is 2-ethyl hexyl acrylate.

The monomer system used to make the acrylic backbone polymer could be solely based on low Tg alkyl acrylate ester monomers, but is preferably modified by inclusion of high Tg monomers and/or functional comonomers, in particular carboxy-containing functional monomers and/or hydroxy-containing functional monomers.

High Tg monomer components which may be present, and in some embodiments are preferably present, include methyl acrylate, ethyl acrylate, isobutyl methacrylate, and/or vinyl acetate. The high Tg monomers may be present in a total amount of up to about 50% by weight, preferably from about 5 to about 50% by weight, even more preferably from about 10 to about 40% by weight, based on total weight of the hybrid polymer.

The acrylic backbone polymer may also comprise one or more functional monomers. Preferred are carboxy and/or hydroxy functional monomers.

Carboxy functional monomers will typically be present in the hybrid polymer in an amount of up to about 7% by weight, more typically from about 1 to about 5% by weight, based on the total weight of the monomers. Useful carboxylic acids preferably contain from about 3 to about 5 carbon atoms and include, among others, acrylic acid, methacrylic acid, itaconic acid, and the like. Acrylic acid, methacrylic acid and mixtures thereof are preferred.

In a particularly preferred embodiment, the acrylic backbone comprises hydroxy functional monomers such as hydroxyalkyl (meth)acrylate esters, and acrylic polymers used to form the backbone of the invention are preferably acrylic ester/hydroxy (meth)alkyl ester copolymers. Specific examples of hydroxy functional monomers include hydroxyethyl acrylate, hydroxypropyl acrylate, hydroxyethyl methacrylate and hydroxypropyl methacrylate. Hydroxy functional monomers are generally used in an amount of from about 1 to about 10%, preferably from about 3 to about 7%.

Other comonomers can be used to modify the Tg of the acrylic polymer, to further enhance adhesion to various surfaces and/or to further enhance high temperature shear properties. Such comonomers include N-vinyl pyrrolidone, N-vinyl caprolactam, N-alkyl (meth)acrylamides such as t-octyl acrylamide, vinyl esters such as vinyl neodecanoate, cyanoethylacrylates, diacetoneacrylamide, N-vinyl acetamide, N-vinyl formamide, glycidyl methacrylate and allyl glycidyl ether.

The monomer proportions of the acrylic polymer are adjusted in such a way that the backbone polymer has a glass transition temperature of less than about −10° C., preferably from about −20° C. to about −60° C.

The macromers which may be used to prepare the graft copolymers will typically have a glass transition temperature of about −30° C. or less, preferably about −50° C. to about −70° C., as determined by differential scanning calorimetry (DSC), and are preferably present in an amount of from about 5 to about 50 percent by weight of the grafted polymer. Tg by DSC is taken as the inflection point of the baseline shift at a scan rate of 20° C./min.

While the molecular weight of the macromer can range from about 2,000 to about 30,000, macromers for use in practicing the invention will preferably have a molecular weight range of from about 2,000 to about 10,000, as determined by gel permeation chromatography (GPC).

Conventionally, saturated rubber macromers may be prepared by a number of well-known methods. One method involves an anionic polymerization to produce a hydroxyl terminated conjugated diene polymer formed from, for example, 1,3-butadiene and/or isoprene monomer, as described in U.S. Pat. No. 5,625,005, the disclosure of which is incorporated herein by reference. Reduction of at least 90%, preferably at least 95%, of the unsaturation in the low molecular weight monool can be achieved through catalytic hydrogenation as taught in U.S. Pat. Nos. Re. 27,145 and 4,970,254, the disclosures of which are incorporated by reference herein. Suitable saturated rubber monools were obtained from Kraton Polymers Company. Kraton® L 1203 is a preferred grade. In the final step, the hydroxyl termination is reacted to form an acrylate or methacrylate group by any of a number of well known methods. These include esterification or transesterification using a strong acid or metal-containing catalyst (e.g., compounds of Ti, Sn and the like), by reaction with an acid chloride, or via a urethane reaction employing a metal catalyst, as described in U.S. Pat. No. 5,625,005.

Polyether macromers having a polyether backbone, such as PEG are commercially available from, for example, Aldrich.

The grafted polymer used in the practice of the invention may be prepared by conventional polymerization methods familiar to those of skill in the art. These methods include, without limitation, solution polymerization, suspension polymerization and bulk polymerization. In solution, the graft copolymers are synthesized by conventional free radical techniques using a solvent mixture. The solvent blend, preferably ethyl acetate, hexane and/or heptane, and toluene, imparts the solubility that is necessary for good coating behavior at low and high coat weights. In the practice of the invention, it may also be advantageous to reduce the residual monomer content following polymerization using methods which are known and conventional in the art.

It is to be understood that the method of preparing the grafted polymers is not limiting to the practice of the invention. The polymers may be prepared by any method that produces a comb-type copolymer having an acrylic backbone and side chains of low Tg macromer. The polymers may be prepared, for example, by copolymerizing alkyl acrylate ester monomers in the presence of a macromers containing a reactive acrylic, methacrylic or vinyl end group. Alternatively, the macromers may be post grafted to the acrylic polymer. In one preferred embodiment, the monomer is grafted by copolymerization with the acrylic monomers through an olefin end group.

The adhesive compositions are preferably crosslinked using a chemical crosslinking agent such as aluminum and titanium crosslinking agents. Specific examples are Aluminum Acetylacetonate and Tyzor GBA as shown in Table 2 and Table 4. The crosslinker is typically added in an amount of from about 0.3% to about 2% by weight of the hybrid polymer.

The adhesive compositions of this invention may optionally be tackified. The acrylic and rubber components of the hybrid polymer are believed to form a microphase separated structure in the solid state. Support for this comes from the appearance of two distinct Tg's in the temperature spectrum of viscoelastic properties corresponding to each component. Tackifying resins useful in these compositions are compatible with the rubber macromer phase. Tackifiers compatible with the acrylic phase can, of course, be used with any acrylic polymer and the hybrid polymer of this invention is no exception. However, such tackifiers are typically derived from natural rosin and are associated with poor aging characteristics. It is an objective of this invention to overcome these problems. Thus the preferred tackifiers are synthetic hydrocarbon resins derived from petroleum. Non-limiting examples of rubber phase associating resins include aliphatic olefin derived resins such as those available from Goodyear under the Wingtack® tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95. The resins normally have ring and ball softening points as determined by ASTM method E28 between about 20° C. and 150° C. Also useful are $C_9$ aromatic/aliphatic olefin-derived resins available from Exxon in the Escorez 2000 series. Hydrogenated hydrocarbon resins are especially useful when the long term resistance to oxidation and ultraviolet light exposure is required. These hydrogenated resins include such resins as the Escorez 5000 series of hydrogenated cycloaliphatic resins from Exxon, hydrogenated $C_9$ and/or $C_5$ resins such as Arkon® P series of resins by Arakawa Chemical, hydrogenated aromatic hydrocarbon resins such as Regalrez® 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan.

The tackifying resin will be present at a level of from 0 to 50% by weight of the adhesive composition.

The formulated adhesive may also include, diluents, emollients, plasticizers, excipients, antioxidants, UV stabilizers, anti-irritants, opacifiers, fillers, such as clay and silica, pigments and mixtures thereof, preservatives, as well as other components or additives.

In addition to the use of adhesives comprising acrylic hybrid polymers to prepare high impact resistant glass laminates and products comprising such glass laminates, the invention also relates to novel adhesive polymers comprising an acrylic backbone and grafted with macromers having a polyether backbones such as, for example, PEG, PPG and PTMG, and to pressure sensitive adhesive articles.

Pressure sensitive adhesives comprising an acrylic backbone grafted with PEG, PPG and/or PTMG macromers may advantageously be used in the manufacture of adhesive articles including, but not limited to, industrial tapes and transfer films. The adhesive articles are useful over a wide temperature range and adhere to a wide variety of substrates, including low energy surfaces, such as polyolefins, e.g., polyethylene and polypropylene, polyvinyl fluoride, ethylene vinyl acetate, acetal, polystyrene, powder-coated paints, and the like. Single and double face tapes, as well as supported and unsupported free films are encompassed by the invention. Also included, without limitation, are labels, decals, name plates, decorative and reflective materials, reclosable fasteners, theft prevention and anti-counterfeit devices.

In one embodiment, the adhesive article comprises an adhesive coated on at least one major surface of a backing having a first and second major surface. Useful backing substrates include, but are not limited to foam, metal, fabric, and various polymer films such as polypropylene, polyamide and polyester. The adhesive may be present on one or both surfaces of the backing. When the adhesive is coated on both surfaces of the backing, the adhesive on each surface can be the same or different.

Both the adhesives prepared using rubber macromers and the adhesives prepared using poly(alkylene glycol) methacrylate macromers have been discovered to be particularly useful when used in the manufacture of high impact resistance articles. Articles requiring impact resistance may advantageously be manufactured using the described pressure sensitive adhesive as a laminating adhesive to bond breakable or otherwise brittle substrates such as glass to flexible substrates made of, e.g., polymer films such as polyvinyl butylral (PVB), polypropylene, polyamide and polyester. Included are LCD displays, plate glass for use in windows, doors, partitions and the like for commercial and residential uses. The adhesive is advantageously used in end use applications where the manufactured article is subjected to vibration, stress or is vulnerable or prone to impact.

The invention provides laminated glass panels and panes that are able to pass the Underwriters Laboratory test standard UL 972. This test considers the ability of a laminated glass to resist burglary or forced entry (e.g., "smash and grab" type burglaries). The test consists of dropping a 3.25 inch, 5 lb (2.25 kg) steel ball through a designated vertical distance onto a sample measuring 24 in by 24 in (61 cm×61 cm). Resistance is determined by whether the steel ball, after 5 impacts per sample, is able to penetrate the laminate. It will be appreciated that when impacted or otherwise attacked, the glass unit will crack. The structural integrity once the glass is cracked becomes dependent on the plastic layer of the laminate. In one preferred embodiment, the polymer film used will be a plastic film laminate of 2 or more film layers, more preferable 3 or more film layers bonded together using the adhesive of the invention. Individual films within the film laminate may be of the same, or may be of different thicknesses. Individual films used to prepare the film laminate will generally range from about 2 to about 10 mils. The adhesive will typically be applied in the 0.5 mil to 3 mils range.

While glass laminates are tested and rated in the industry by Underwriters Laboratory according to standards set forth in UL-972, in the following test examples impact resistance was measured by a Pendulum Impact Tester using the procedure described below.

EXAMPLES

In the following examples, the following adhesive test methods were used.
Preparation of Coatings:

The adhesive solutions were cast on a silicone coated release liner, air dried for 15 minutes, and then dried for 3 minutes at 250° F. in a forced air oven. The films were then laminated to a backing film and conditioned overnight at 22° C. and 50% relative humidity. Unless otherwise indicated the dried adhesive film thickness was 1 mil (25 microns) and the backing film was 2 mil PET (polyethylene terephthate) film.
Peel Adhesion:

Peel adhesion at 180° between the backing and the adherend test panel was measured according to Test Method number 1 of the Pressure Sensitive Tape Council (PSTC), Northbrook, Ill., adapted as follows. The peel strength was measured after wetting out a stainless steel (SS) test panel for 20 minutes or as otherwise indicated. The testing was also carried out on high density polyethylene (HDPE) test panels. Unless otherwise indicated, all testing was performed at 22° C. and 50% relative humidity.
Shear Holding Power:

Shear holding power was measured according to PSTC Test Method number 7, adapted as follows. The holding power was measured under a shear load of 1 kg on a 0.5 inch wide by 1 inch long area, applied after wetting out the test panel for 15 minutes. Unless otherwise indicated, all testing was performed at 22° C. and 50% relative humidity.
Hot Shear:

Shear Holding was also measured at elevated temperature conditions. 5 lb weight with 1"×1" overlap area. Samples conditioned at 150° F. for 15 minutes before applying weight.
Impact Resistance:

As noted above, the industrial standard, UL 972 for Burglary Resisting Glazing material, consists of multiple impact tests wherein a 5 lb steel ball is dropped onto 2'×2' laminated glass substrate over different distances (8-40 feet) and under different temperatures (−10 to 49° C.).

The ideal pressure sensitive adhesive (PSA) adhesive used in this laminate will lead to minimum amount of delamination of glass from plastic facestock. This requirement translates into a strong bonding of PSA under very high speed delamination process, about 10000× fold higher than regular peeling test speed of 12"/min.

To screen the impact resistance of PSA, a Pendulum Impact tester, with a 2.5 lb metal ball dropping in pendulum motion over 2 feet in perpendicular distance. The laminated glass test panel consisted of 0.25 inch thick glass bonded with the adhesive sample to a PET laminate consisting of three films bonded together with the same adhesive sample. The percentage of PET film delaminated from glass plate was measured after the collision, less of which indicates a better impact resistance of the product. Broken glass pieces that remained laminated to PET film, with minimum amount of delamination taking place had better impact resistance.

The following abbreviations are in the Examples and Tables.
2-EHA: 2-ethylhexyl acrylate
HEA: 2-hydroxyethyl acetate
MA: methyl acrylate
VAc: vinyl acetate
AA: acrylic acid
HEMA: hydroxyethyl methacrylate
IBMA: isobutyl methacrylate
PEG macromer: poly(ethylene glycol) methyl ether methacrylate with Mn 1100, inhibited with 100 ppm monomethyl ether hydroquinone and 300 ppm butylated hydroxytoluene, available from Aldrich.
Al(acac)3: aluminum acetylacetonate from Aldrich
Tyzor GBA: 75% solution in alcohols of bis(2,4'-pentanedionate-O,O')bis(2-propanolato)-titanium; available from Du Pont Co., Wilmington, Del.
AF: adhesive failure to substrate
CF: cohesive failure Example 1

Acrylic polymer sample A served as control polymer. The composition of acrylic polymer sample A is shown both in Tables 1 and 3, and was prepared as follows.

An initial charge mixture containing 9.4 g 2-ethylhexyl acrylate (2-EHA), 20.1 g Vinyl Acetate (VAc), 0.6 g of Acrylic Acid (AA), 10.12 g ethyl acetate (EtOAc), 13.71 g heptanes (a standard mixed isomer grade), and 0.05 g azobis (isobutyronitrile) (AIBN) was prepared and charged to a 3 liter 4-neck round bottomed flask equipped with stainless steel stirrer, thermometer, condenser, water bath, and slow addition funnels. The initial charge was heated to reflux while stirring. After 10 minutes at reflux a monomer mix containing 65.5 g 2-EHA, 4.39 g Acrylic Acid and an initiator mix containing 6.23 g EtOAc, 8 g heptanes, 0.25 g AIBN were simultaneously, separately, and uniformly added over a period of 2 hours and 3 hours, respectively. At the end of the additions the flask contents were held at reflux for a further 2 hours. Next the residual monomers were scavenged using a short half-life initiator added over a one hour period and the solution was held under reflux for a further hour. Then diluent consisting of 8.12 g Heptanes, 22.57 g of Isopropanol (IPOH) and 5.39 g of Xylene was slowly added to the reactor contents while cooling the contents to room temperature. The polymer solution maintained a fluid viscosity throughout the reaction and showed no tendency to climb the reactor stirring shaft.

The polymer solution had a solids content of 53.21% and a Brookfield viscosity of 9380 cps.

Example 2

This example describes the preparation of an adhesive polymer solution sample B using a methacrylate terminated ethylene-butylene macromer. The molecular weight averages of the macromer were determined by GPC, relative to polystyrene standards, to be Mn=6600, Mw=7200 Daltons.

Adhesive polymer sample B has the composition shown in Table 1 and was prepared as follows.

An initial charge mixture containing 10.86 g 2-ethylhexyl acrylate (2-EHA), 4.13 g ethylene-butylene macromer, 3.1 g methyl acrylate (MA), 1.03 g 2-hydroxyethylacrylate (2-HEA), 10 g ethyl acetate (EtOAc), 11.67 g hexanes (a standard mixed isomer grade), and 0.05 g azobis(isobutyronitrile) (AIBN) was prepared and charged to a 3 liter 4-neck round bottomed flask equipped with stainless steel stirrer, thermometer, condenser, water bath, and slow addition funnels. The initial charge was heated to reflux while stirring. After 10 minutes at reflux a monomer mix containing 41.64 g 2-EHA, 23.38 g ethylene-butylene macromer, 11.9 g MA, 3.97 g HEA, and 5 g hexanes, and an initiator mix containing 40 g EtOAc, 10 g hexanes and 0.25 g AIBN were simultaneously, separately, and uniformly added over a period of 2 hours and 3 hours, respectively. At the end of the additions the flask contents were held at reflux for a further 2 hours. Next the residual monomers were scavenged using a short half-life initiator added over a one hour period and the solution was held under reflux for a further hour. Then diluent consisting of 33.3 g toluene was slowly added to the reactor contents while cooling the contents to room temperature. The polymer solution maintained a fluid viscosity throughout the reaction and showed no tendency to climb the reactor stirring shaft.

The polymer solution had a solids content of 42.7% and a Brookfield viscosity of 2500 cps. The molecular weight averages, determined by gel permeation chromatography, were Mw=560,000 and Mn=34,000.

Adhesive polymer samples C, D and E, having the compositions shown in Table 1 were similarly prepared.

Adhesive polymers A-E were formulated using an amount of the crosslinking agent shown in Table 2. Polymer B was formulated with Tyzor GBA and aluminum acetylacetonate as crosslinking agent, respectively. The formulated polymer was tested and performance results are also shown in Table 2. In comparison to control A, it can be seen that glass delamination after collision was greatly reduced when using a hybrid acrylic polymer. Use of a rubber acrylic hybrid adhesive significantly improves impact resistance.

TABLE 1

| Composition | A | B | C | D | E |
|---|---|---|---|---|---|
| % 2-EHA | 74.9 | 52.5 | 74.9 | 74.9 | 63 |
| % MA | | 15 | | | |
| % Vac | 20.1 | | 10 | 5 | 5 |
| % AA | 5 | | 5 | 5 | 5 |
| % HEA | | 5 | | | |
| % EB macromer | | 27.5 | 10.1 | 15.1 | 27 |
| viscosity (cps) | 9380 | 2500 | 2500 | 1168 | 5696 |
| solid | 53.20% | 42.70% | 50.3 | 43.87 | 43.5 |

Example 3

This example describes the preparation of an adhesive polymer sample BB using a poly(ethylene oxide)methyl ether methacrylate as macromer.

Adhesive polymer sample BB has the composition shown in Table 3 and was prepared as follows.

An initial charge mixture containing 9.4 g 2-ethylhexyl acrylate (2-EHA), 10 g of Vinyl Acetate (VAc), 0.6 g of Acrylic Acid (AA), 10.12 g ethyl acetate (EtOAc), 13.71 g heptanes (a standard mixed isomer grade), and 0.05 g azobis (isobutyronitrile) (AIBN) was prepared and charged to a 3 liter 4-neck round bottomed flask equipped with stainless steel stirrer, thermometer, condenser, water bath, and slow addition funnels. The initial charge was heated to reflux while stirring. After 10 minutes at reflux a monomer mix containing 65.5 g 2-EHA, 10.1 g poly(ethylene glycol)methyl ether methacrylate macromer, 4.39 g AA, and 15 g EtOAc, and an initiator mix containing 6.23 g EtOAc, 8 g heptanes, and 0.25 g AIBN were simultaneously, separately, and uniformly added over a period of 2 hours and 3 hours, respectively. At the end of the additions the flask contents were held at reflux for a further 2 hours. Next the residual monomers were scavenged using a short half-life initiator added over a one hour period and the solution was held under reflux for a further hour. Then diluent consisting of 13.13 g Xylene, 8.78 g Heptanes and 15 g Isopropanol was slowly added to the reactor contents while cooling the contents to room temperature. The polymer solution maintained a fluid viscosity throughout the reaction and showed no tendency to climb the reactor stirring shaft.

The polymer solution had a solids content of 48.5% and a Brookfield viscosity of 2230 cps.

Adhesive polymer samples CC, DD and EE, having the compositions shown in Table 3 were similarly was prepared.

Adhesive polymers A, BB, CC, DD and EE were formulated using an amount of the crosslinking agent shown in Table 4. Polymer BB was formulated with Tyzor GBA and aluminum acetylacetonate as crosslinking agent, respectively. The formulated polymer was tested and performance results are also shown in Table 4. In comparison to control A, it can be seen that glass delamination after collision was greatly reduced when using an adhesive polymer comprising the reaction product of an acrylic polymer and a poly(alky-

TABLE 2

| | PSA polymer | | | | | |
|---|---|---|---|---|---|---|
| | A | B | B | C | D | E |
| Active crosslinker | Al(acac)3 | Tyzor GBA | Al(acac)3 | Al(acac)3 | Al(acac)3 | Al(acac)3 |
| Active crosslinker, % | 0.47 | 0.9 | 0.6 | 0.47 | 0.47 | 0.47 |
| Peel (oz/in) | | | | | | |
| 20 min | 55.1 AF | 45 AF | 35.4 AF | 59.9 CF | 52 CF | 32.8 CF |
| 24 hour | 64.2 AF | 41.7 AF | 51.7 CF | 99.2 CF | 81.9 CF | 27 CF |
| 1 week | 75 AF | 50 CF | 59.9 CF | 98.7 CF | 71.5 CF | 22.9 CF |
| Shear (hours) | 128.5 | >740 | 46.5 | 2.5 | 4 | 12.7 |
| Glass delamination after collision | 20-25% | 0-3% | 3-9% | 10-13% | 10-16% | 10% | lene oxide) macromer. Use of the type of adhesive significantly improves impact resistance.

From the results it can be seen that by reacting an acrylic polymer with a poly(alkylene oxide) macromer produces novel pressure sensitive adhesives having improved impact resistance.

TABLE 3

| Composition | A | BB | CC | DD | EE |
|---|---|---|---|---|---|
| % 2-EHA | 74.9 | 74.9 | 59.9 | 59.9 | 59.9 |
| % VAc | 20.1 | 10 | 20 | 10 | 10 |
| % AA | 5 | 5 | 5 | 5 | 5 |
| % HEMA | | | | 10 | |
| % IBMA | | | | | 10 |
| % PEG macromer | | 10.1 | 15.1 | 15.1 | 15.1 |
| viscosity (cps) | 9380 | 2230 | 9504 | 8264 | 6176 |
| solid | 53.20% | 48.50% | 52.80% | 48.60% | 54.70% |

TABLE 4

| | PSA polymer | | | | | |
|---|---|---|---|---|---|---|
| | A | BB | BB | CC | DD | EE |
| Active crosslinker | Al(acac)3 | Al(acac)3 | Tyzor GBA | Al(acac)3 | Al(acac)3 | Al(acac)3 |
| Active crosslinker, % | 0.47 | 0.47 | 1.48 | 0.47 | 0.47 | 0.47 |
| Peel (oz/in) | | | | | | |
| 20 min | 55.1 AF | 31.8 AF | 6.4 AF | 26.7 AF | 47.8 AF | 27.6 AF |
| 24 hour | 64.2 AF | 37.2 AF | 20.4 AF | 30 AF | 49.8 AF | 32.2 AF |
| 1 week | 75 AF | 37.5 AF | 23.2 AF | 24.7 AF | 61.8 AF | 40.9 CF |
| Shear (hours) | 128.5 | 3.6 | 55 | 2.6 | 10.9 | 1.96 |
| Glass delamination after collision | 20-25% | 7-15% | 6% | 0-5% | 3-10% | 2-6% |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An impact resistant article comprising a breakable substrate bonded to a flexible substrate, wherein the breakable substrate is bonded to the flexible substrate using a pressure sensitive adhesive comprising the reaction product of an acrylic polymer and a macromer,
    wherein the macromer has a glass transition temperature of about −30° C. or less and has an aliphatic hydrocarbon backbone selected from the group consisting of poly(ethylene-butylene), poly(ethylene-propylene), poly(ethylene-butylene-propylene) and mixtures thereof;
    wherein the pressure sensitive adhesive is substantially free of a tackifier; and
    wherein the article has an improved impact resistance over an article comprising the pressure sensitive adhesive without said macromer.

2. The article of claim 1 wherein the breakable substrate is a glass substrate.

3. The article of claim 2 wherein the flexible substrate is a plastic film.

4. The article of claim 3 where the plastic film is a plastic laminate.

5. The article of claim 4 which is an impact resistant window, door or display case.

6. The article of claim 3 wherein the plastic film is sandwiched between two glass substrates.

7. The article of claim 1 wherein the pressure sensitive adhesive comprises the reaction product of an acrylic polymer and a polyethylene-butylene macromer.

8. The article of claim 1 wherein the pressure sensitive adhesive comprises an acrylic polymer prepared from monomers selected from the group consisting of acrylate monomers, homopolymers of which have a glass transition temperature less than 0° C., monomers, homopolymers of which have a glass transition temperature greater than 0° C., acid functional monomers, hydroxy functional monomers and mixtures thereof.

9. The article of claim 8 wherein the pressure sensitive adhesive comprises an acrylic polymer prepared from 2-ethyl hexyl acrylate, acrylic acid, and vinyl acetate or methacrylate.

10. An impact resistant article comprising a breakable substrate bonded to a flexible substrate, wherein the breakable substrate is bonded to the flexible substrate using a pressure sensitive adhesive composition in the form of a single type polymer comprising a random copolymer prepared by a reaction product of an acrylic polymer and a macromer,
    wherein the macromer has (i) a glass transition temperature of about −30° C. or less, (ii) a molecular weight range from about 2,000 to about 30,000 and (iii) an alkylene oxide backbone selected from the group consisting of poly(ethylene glycol), polypropylene glycol), poly(tetramethylene glycol) and mixtures thereof; and
    wherein the article has an improved impact resistance over an article comprising the pressure sensitive adhesive without said macromer.

11. The article of claim 10 wherein the pressure sensitive adhesive comprises the reaction product of an acrylic polymer and a poly(ethylene glycol) macromer.

12. The article of claim 10 wherein the breakable substrate is a glass substrate.

13. The article of claim 12 wherein the flexible substrate is a plastic film.

14. The article of claim 13 where the plastic film is a plastic laminate.

15. The article of claim 13 wherein the plastic film is sandwiched between two glass substrates.

16. The article of claim 15 which is an impact resistant window, door or display case.

17. The article of claim 10 wherein the pressure sensitive adhesive comprises an acrylic polymer prepared from monomers selected from the group consisting of acrylate monomers, homopolymers of which have a glass transition temperature less than 0° C., monomers, homopolymers of which have a glass transition temperature greater than 0° C., acid functional monomers, hydroxy functional monomers and mixtures thereof.

18. The article of claim 17 wherein the pressure sensitive adhesive comprises an acrylic polymer prepared from 2-ethyl hexyl acrylate, acrylic acid, and vinyl acetate or methacrylate.

* * * * *